US012124514B2

(12) United States Patent
Soto et al.

(10) Patent No.: US 12,124,514 B2
(45) Date of Patent: Oct. 22, 2024

(54) TRANSFORMATION OF HIERARCHICAL DATA STRUCTURE INTO A GRID PATTERN

(71) Applicant: THE BANK OF NEW YORK MELLON, New York, NY (US)

(72) Inventors: Claudio Alberto Soto, Lawrenceville, NJ (US); Aravind Kumar Ravindran, Johns Creek, GA (US)

(73) Assignee: THE BANK OF NEW YORK MELLON, New York, NY (US)

( * ) Notice: Subject to any disclaimer, the term of this patent is extended or adjusted under 35 U.S.C. 154(b) by 60 days.

(21) Appl. No.: 17/967,386

(22) Filed: Oct. 17, 2022

(65) Prior Publication Data

US 2024/0126814 A1  Apr. 18, 2024

(51) Int. Cl.
| | | |
|---|---|---|
| *G06F 16/00* | (2019.01) | |
| *G06F 16/28* | (2019.01) | |
| *G06F 16/901* | (2019.01) | |
| *G06N 5/01* | (2023.01) | |

(52) U.S. Cl.
CPC ........ *G06F 16/9027* (2019.01); *G06F 16/287* (2019.01); *G06N 5/01* (2023.01)

(58) Field of Classification Search
None
See application file for complete search history.

(56) References Cited

U.S. PATENT DOCUMENTS

| | | | |
|---|---|---|---|
| 6,502,101 B1 | 12/2002 | Verprauskus et al. | |
| 8,868,593 B1 | 10/2014 | Zhang | |
| 9,230,342 B1* | 1/2016 | Yates | G06F 3/14 |
| 11,074,653 B2* | 7/2021 | Blank | G06Q 40/06 |
| 2003/0050906 A1* | 3/2003 | Clifton-Bligh | G06F 16/904 |
| 2004/0148571 A1* | 7/2004 | Lue | G06F 16/9577 715/239 |
| 2006/0271847 A1* | 11/2006 | Meunier | G06V 30/416 715/255 |
| 2007/0098266 A1* | 5/2007 | Chiu | G06F 16/58 707/E17.026 |
| 2007/0168856 A1* | 7/2007 | Berkner | G06F 16/34 707/E17.093 |

(Continued)

OTHER PUBLICATIONS

International Search Report and Written Opinion of the International Searching Authority dated Jan. 24, 2024, issued in corresponding International Application No. PCT/US2023/076852 (10 pgs.).

*Primary Examiner* — Hasanul Mobin
(74) *Attorney, Agent, or Firm* — Pillsbury Winthrop Shaw Pittman, LLP

(57) ABSTRACT

The disclosure relates to systems and methods of generating a grid pattern display from hierarchical data structures. A system may access a hierarchical data structure comprising a root node, a parent node, and a leaf node. The system may obtain a leaf node size and determine a margin for each cell and each group in the grid pattern to ensure uniform spacing for the leaf nodes in the grid pattern. The system may set presentation layer data based on the determined spacing to generate a set of data elements of the presentation layer. The system may split the set of data elements of the presentation layer based on a size of a display container, the display container being used to display the grid pattern. The system may consume the presentation layer into a display layer to render a grid transformation of the hierarchical data.

16 Claims, 13 Drawing Sheets

(56) References Cited

U.S. PATENT DOCUMENTS

| | | | |
|---|---|---|---|
| 2009/0019348 A1* | 1/2009 | King | G06F 16/904 |
| | | | 715/833 |
| 2009/0113350 A1 | 4/2009 | Hibino et al. | |
| 2010/0169853 A1* | 7/2010 | Jain | G06F 30/33 |
| | | | 716/106 |
| 2010/0265284 A1* | 10/2010 | Satou | H04N 13/324 |
| | | | 345/697 |
| 2016/0070434 A1* | 3/2016 | Clark | G06F 8/38 |
| | | | 715/762 |
| 2020/0151924 A1 | 5/2020 | North et al. | |
| 2021/0081400 A1* | 3/2021 | Park | H04L 9/0637 |
| 2024/0126814 A1* | 4/2024 | Soto | G06F 16/9027 |

\* cited by examiner

TRANSFORMATION OF HIERARCHICAL DATA STRUCTURE INTO A GRID PATTERN

BACKGROUND

Data is oftentimes organized into hierarchical data structures to represent relationships between different hierarchical layers. For example, a tree data structure may represent hierarchical relationships such as genealogical histories, employee organization charts, and others. These and other types of hierarchical data structures may store data in a way that preserves hierarchical relationships. Because the hierarchical relationships may branch in different directions and include multiple hierarchical levels, hierarchical data structures may exhibit non-linearity. This non-linearity may cause issues when rendering displays for presenting the data.

For example, the amount of hierarchical data may be larger than what screens can meaningfully display. To limit the amount of display space hierarchical data structures occupy, some rendering systems may generate hierarchical displays that require user interactions such as by clicking on different nodes to reveal nested data. However, these rendering systems necessarily require inefficient interface control and may result in obscuring nested data, which may include pertinent alert data. These and other issues may be exacerbated when the hierarchical data is updated in real-time, necessitating dynamically generated displays that may be unable to meaningfully present the updated data. Though these and other issues typically occur for smaller screen sizes such as on mobile devices, they can also occur for larger screen sizes such as television and projection images depending on the amount and non-linearity of hierarchical data to be displayed. These and other issues may exist when rendering displays for hierarchical data.

SUMMARY

Various systems and methods may address the foregoing and other problems. For example, a system may generate a display having a grid pattern for visualizing a hierarchical data structure. The hierarchical data structure may include a root node, a parent node, and a leaf node. Parent nodes may be children of other parent nodes or of the root node, which has no parent. A leaf node has no children but may be a child of the root node or a parent node. Each node may occupy a node level. For example, the root node may be on a root node level, a parent node may be on a parent node level and a leaf node may be on a leaf node level. There may be two or more node levels in a given hierarchical tree.

The system may arrange the various nodes of the hierarchical data structure in a grid pattern. A grid pattern may refer to an arrangement of data elements in a coordinate system having a network of horizontal and perpendicular coordinates (such as an x-axis and y-axis coordinates) for locating positions within a display. The horizontal and perpendicular coordinate system may be conceptually represented as uniformly spaced lines. Arrangement of a hierarchical data structure using a grid pattern may reduce the use of display space compared to hierarchical tree displays. Furthermore, the grid pattern may be dynamically updated when underlying data in the hierarchical data structure is updated and/or when a display container such as a window that displays the grid pattern is resized. The system may also improve a user experience (UX) since humans may be able to easily discern hierarchical data in the grid pattern, since the grid pattern generated by the system provides structure while efficiently using display space.

To render non-linear data in a hierarchical data structure using a grid pattern, the system may reconcile the non-linear data and the grid pattern (rows and cells) without losing information conveyed by nodes in the hierarchical data structure. In particular, groups of intermediate nodes and a root node may be maintained in the grid pattern. To achieve reconciliation between non-linear (tree-like hierarchical) structures and grid patterns, the system may render a grid pattern to fit a display container such as a window displayed in an electronic display. The grid pattern may include grid cells that each show content of leaf nodes, while leaving enough space between cells so to render groups of intermediate nodes showing hierarchical relationships within the group. The system may dynamically perform this grid pattern rendering responsive to events that may necessitate re-renders. These events may include updates to one or more of the nodes of the hierarchical data structure, a resizing of the display container, and/or other event that causes a potential change to the layout of nodes in a grid pattern.

The system may render the grid pattern based on a leaf node size. The system may impose minimum and maximum boundaries for the leaf node size. The system may determine presentation layer data based on the leaf node size and a size of the display container. The presentation layer data may be stored for each element being laid out. The presentation layer data may include spacing information, metadata, and/or other information known about the element. The spacing information may include data that specifies display space occupied by the element in the grid pattern. The spacing information may include a padding, a margin, a width, a height, and/or other information that conveys display space used by or associated with the element.

Each element may also include metadata that describes properties of the element. Laying out each element in the presentation layer may refer to determining one or more of the presentation layer data for the element. Elements may be implemented in various ways based on the particular implementation. One example of an element is an hyper-text markup language (HTML) element, which may be accessed from a cascading style sheet (CSS) function. Other types of elements that can be used to render objects for display in a display container may be used as well or instead. In some examples, a leaf node may be represented as a cell element ("cell"). Parents of the leaf nodes may be represented as a group that group child cell elements so that a child cell may be nested within a parent group.

The system may determine a padding and a margin for each of the cells and each of the groups so that at any node level, the same distance between neighboring leaf nodes (cells) is achieved. The system may set this information in the presentation layer data of the elements. To improve computational performance, the presentation layer data used for placing the elements is determined prior to rendering the display. For example, the system may determine and set the presentation layer data attributes and metadata in the presentation layer The presentation layer may be rendered as a set of data elements, such as in a single row. The system may split the set of data elements across rows in the grid pattern based on a layout pattern. To keep groups contiguous, the system may use a layout pattern in which the order of the elements is inverted between odd rows and event rows in a winding fashion. If a group of elements is to be split to a next row because the container width has been exceeded, the next row will start on the same side of the next line. Examples of such layouts are described with reference to FIGS. 7A-7F.

A view layer consumes the presentation layer data, in which the system renders the grid pattern from the presentation layer data. Groups may be visually distinguished from each other. The visual distinction may be made by setting different background colors based on the node level and/or other visual distinctions. The view layer may be presented via a display of a device that presents the rendered grid pattern.

Transforming hierarchical data structures to a grid pattern may be used in various contexts. For example, in systems monitoring, there may be many systems being monitored simultaneously to ensure security and maintain operational performance. These and other systems may include hierarchical relationships that may be important to understand in order to troubleshoot problems that may arise in various hierarchical contexts such as physical, network, application, and/or other layers. Because of the non-linearity of this data, rendering information for real-time consumption may be problematic, especially if data alerts are time-sensitive. The grid pattern may maintain hierarchical relationships in a visual way that efficiently uses display space, while having an ability to convey state information of the underlying data. For example, the grid pattern may be colored or otherwise rendered to indicate alert conditions in a given leaf node. Thus, if a problem develops in a monitored system, a corresponding leaf node may be easily identifiable as a uniquely colored or otherwise uniquely displayed element in the grid pattern. Such monitoring may be enhanced through the grid patterns generated by the system, whether through personal screens and/or through data command centers that may have larger display formats.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
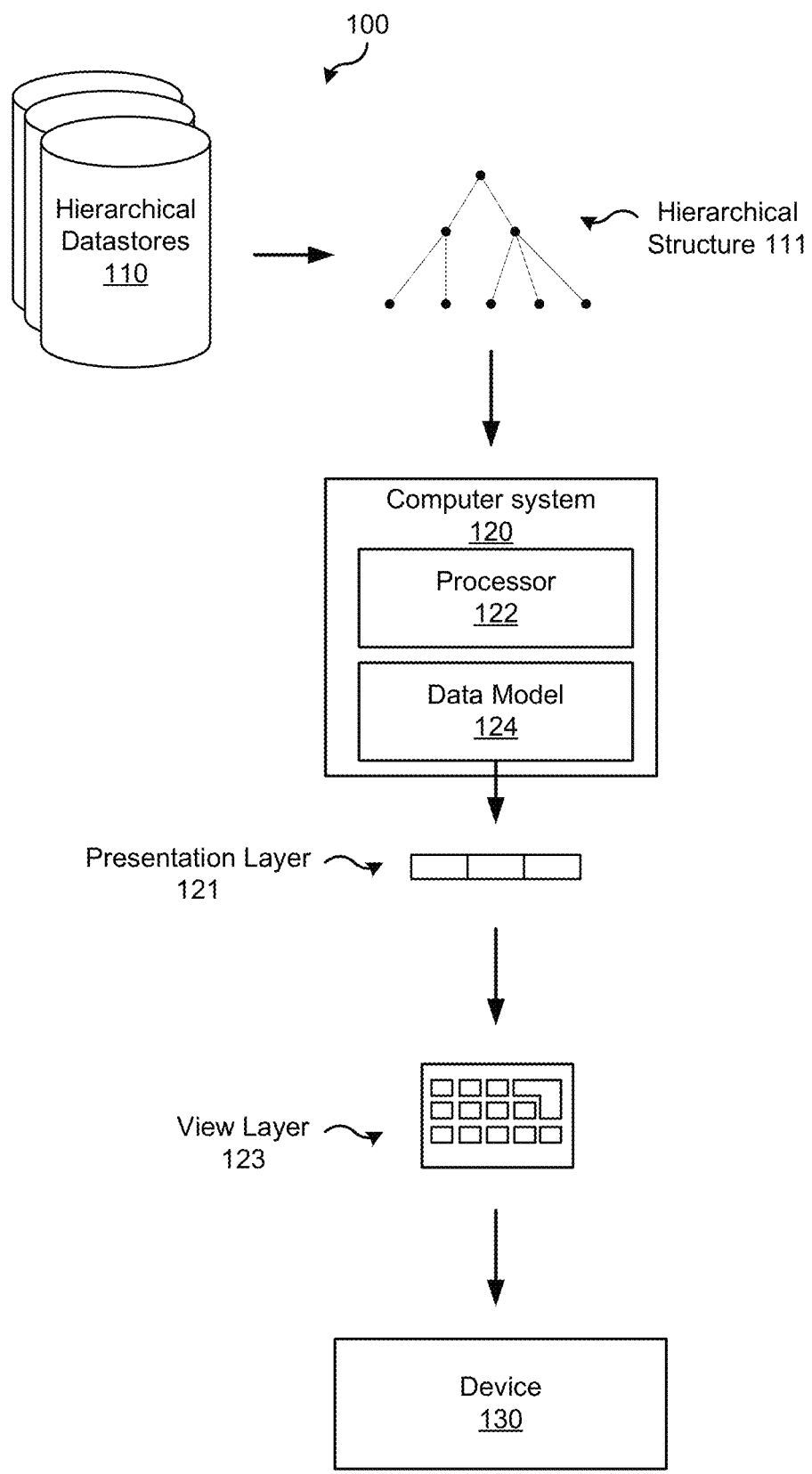
FIG. 1 illustrates an example of a system for transforming hierarchical data structures into a view layer having a grid pattern.

FIG. 1 illustrates an example of a system 100 for transforming hierarchical data structures 111 into a view layer 123 having a grid pattern. The system 100 may include hierarchical datastore 110, a computer system 120, a device 130, and/or other features. The hierarchical datastore 110 may store hierarchical data structures 111. A hierarchical data structure 111 may refer to data that is stored in a way that is linked to one another to maintain hierarchical relationships. For example, a hierarchical data structure 111 may link data together in parent-child relationships. These parent-child relationships may be recursive in that there may be multiple generations, or hierarchical layers, of the hierarchical data structure 111. It should be noted that node-link diagrams are used throughout to represent a hierarchical data structure (such as hierarchical data structure 111) for illustration. Other types of diagrams may represent the hierarchical data structure 111. Furthermore, root nodes are illustrated as being on a "top" node layer in which the tree nodes radiate downward to the leaf nodes. However, the representation may include root nodes being on a "bottom" node layer such that the tree nodes radiate upward to the leaf nodes. The examples described herein are therefore used for illustrating modeling hierarchical relationships in hierarchical data structures in a grid pattern.

An example of a hierarchical data structure 111 includes a tree data structure. A tree data structure may refer to a collection of nodes having parent-child relationships. A node may represent a data value, which may hold a state. The state refers to a current condition of the node, such as a user interaction, data update, and/or other data indicating a current value. A node may be connected to another node by an edge. An edge refers to a logical connection between two nodes. In some examples, an edge may hold state. An edge may link nodes a parent-child relationship—though sibling relationships are possible. In some examples, each node has a single parent but may have one or more child nodes. Each node is connected to its child nodes via edges.

A parent node is an immediate predecessor of a node. As used herein, a parent node may also be referred to as a "group." A child node may refer to a successor of a parent node. A root node may refer to a top level node that has no parents. As such, a tree data structure may originate at the root node. A leaf node may refer to a node that has no children. The leaf node may hold state. A node level may refer to the number of edges along a unique path traversing up the tree between a node at the node level and the root node. In some examples, only the leaf node will include data for display. In some examples, leaf nodes will be on the same level as one another. In these examples, leaf nodes will be the same distance to a root node in a tree data structure.

The computer system 120 may include access one or more hierarchical data structures 111 and transform the one or more hierarchical data structures 111 into a view layer 123 having a grid pattern for display on the device 130. To do so, the computer system 120 may include one or more processors 122, a data model 124, and/or other components. The processor 122 may include one or more of a digital processor, an analog processor, a digital circuit designed to process information, an analog circuit designed to process information, a state machine, and/or other mechanisms for electronically processing information. Although processor 122 is shown in FIG. 1 as a single entity, this is for illustrative purposes only. In some embodiments, processor 122 may comprise a plurality of processing units. These processing units may be physically located within the same device, or processor 122 may represent processing functionality of a plurality of devices operating in coordination.

The processor 122 is programmed to execute one or more computer program components. The computer program components may include software programs and/or algorithms coded and/or otherwise embedded in processor 122, for example. The one or more computer program components or features may include a data model 124 and/or other components or functionality. Processor 122 may be configured to execute or implement the data model 124 by software; hardware; firmware; some combination of software, hardware, and/or firmware; and/or other mechanisms for configuring processing capabilities on processor 122.

The data model 124 may take as input a hierarchical data structure 111, compute a layout of nodes in the hierarchical data structure 111 and generate a presentation layer 121 that is consumed by the view layer 123 having a grid pattern for display at the device 130. Various operations of the data model 124 and illustrations made for clarity are discussed with respect to FIGS. 2-9.

Figure 2:
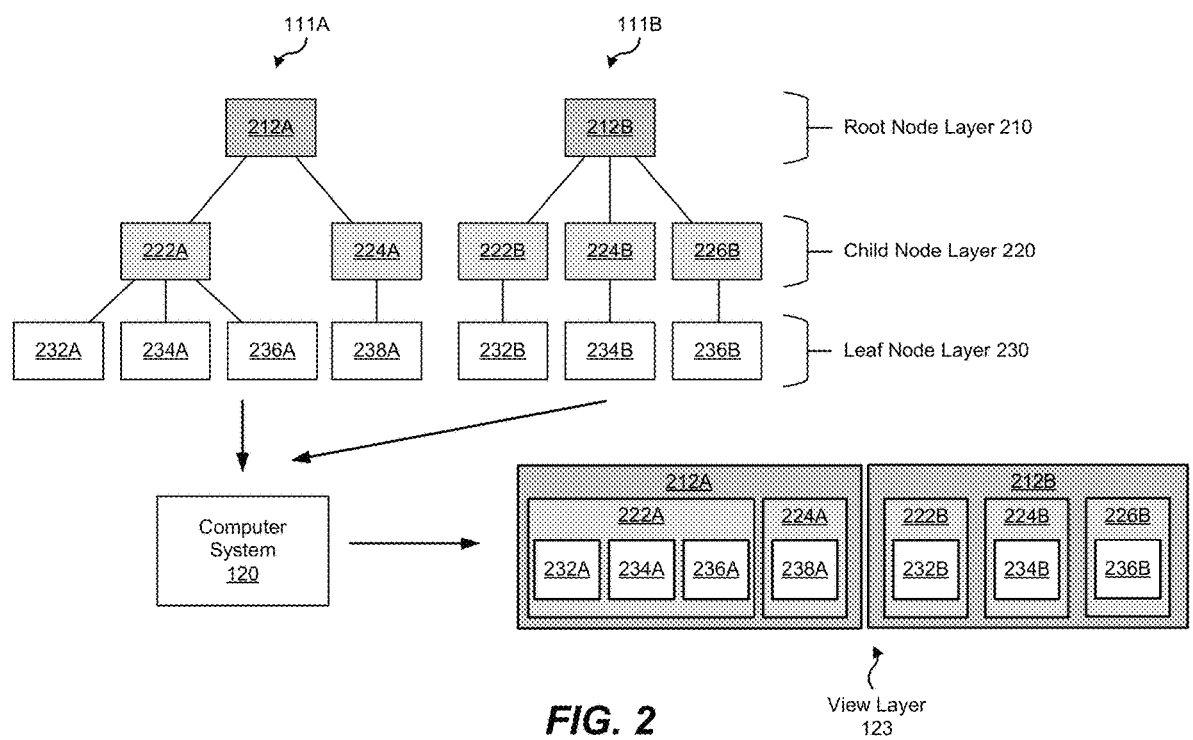
FIG. 2 illustrates an example of a hierarchical data structure (such as a tree structure) transformed into a grid pattern layer.

FIG. 2 illustrates an example 200 of hierarchical data structures 111A and 111B transformed into a view layer 123 having a grid pattern. Two hierarchical data structures 111A and 111B are shown for clarity. However, other numbers of hierarchical data structures 111 may be transformed into a grid pattern, including one or more than two hierarchical data structures. As illustrated, hierarchical data structure 111A and 111B each include a root node layer 210, a child node layer 220, and a leaf node layer 230. The root node layer 210 includes a root node 212A and 212B. If should be noted that the illustrated child nodes (222A, 224A, 222B, 224B, 226B) in child node layer 220 are also parents to respective leaf nodes (232A, 234A, 236A, 238A, 232B, 234B, 236B) in leaf node layer 230. Other numbers of node levels and nodes may be transformed instead or as well. The example 200 shows the layout of the various nodes in the hierarchical data structures 111A and 111B.

Figure 3:
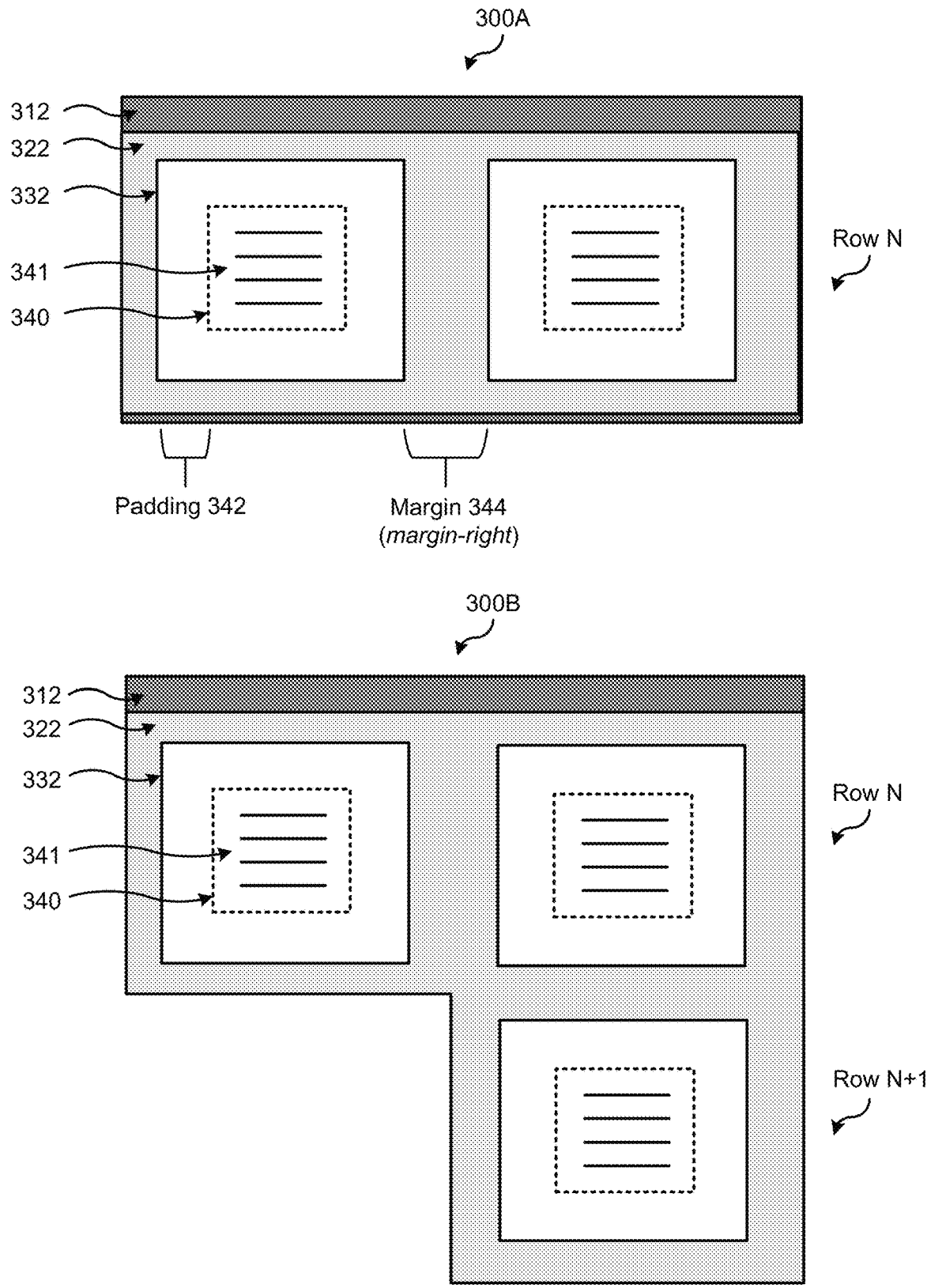
FIG. 3 illustrates examples of grid patterns and spacing between grid elements.

FIG. 3 illustrates examples of grid patterns 300A and 300B and presentation data (such as a padding 342 and a margin 344) between grid elements. Grid pattern 300A illustrates a simplified example of a hierarchical data structure that was transformed into a grid pattern for display. For example, group 312 may represent a root node. Cell 322 may represent a child node of the root node. Cell 332 may represent a leaf node of the child node. Each of the group 312, cell 322, and cell 332 may occupy display space that is defined by an outline (illustrated as a bounding box, although other bounding shapes may be used). The outline may be visible or invisible in a display. The cell 332 may include content 341, such as state information, of the leaf node. The content may be within a content boundary 340, which is illustrated in dashed lines.

Padding 342 defines a spacing between the content boundary 340 and the boundary of the cell 332. Margin 344 defines an amount of space between a position in a row at which a boundary of an element (such as a group 312, cell 322, or cell 332) is located. The illustrated margin 344 shows an example of a margin-right property for cell 332 that defines an amount of space on the right side of the cell 332 before a next element (cell) can be placed. Other types of margins 344 (such as a margin-left) may be used depending on the configuration of the layout. It should be further noted that a top and/or bottom margin may be determined for spacing between rows in the grid pattern. As will be described below, the spacing of the grid elements (such as via padding 342 and/or margin 344) may be dynamically determined for layout purposes and may be made equal across the grid pattern to improve readability and consistency. Reference to left, right, top, and bottom may refer to directionality of a display as it is intended to be read by a user facing a display.

In some examples, as node levels in a hierarchical data structure 111 are traversed, the corresponding group 312, cell 322 and cell 332 (and/or other cells) may be displayed differently, such as having different shading, color, and/or other visually distinguishing characteristics. As illustrated, traversing from a root node (group 312) to a leaf node (cell 332), the shading becomes lighter. In other examples not illustrated, traversing from a root node (group 312) to a leaf node (cell 332), the shading may become darker. This may further facilitate improve viewing the hierarchical data structure 111 in a grid pattern.

Grid pattern 300B illustrates a simplified example of a hierarchical data structure that was transformed into a grid pattern for display with an elbow feature. The elbow display occurs when display space occupied by a group (such as group 312 as illustrated) exceeds available space in a row. The computer system 120 in this instance may flow the group the next row with a continuous display feature to indicate overflowed portion in the next row is part of the group.

Figure 4:
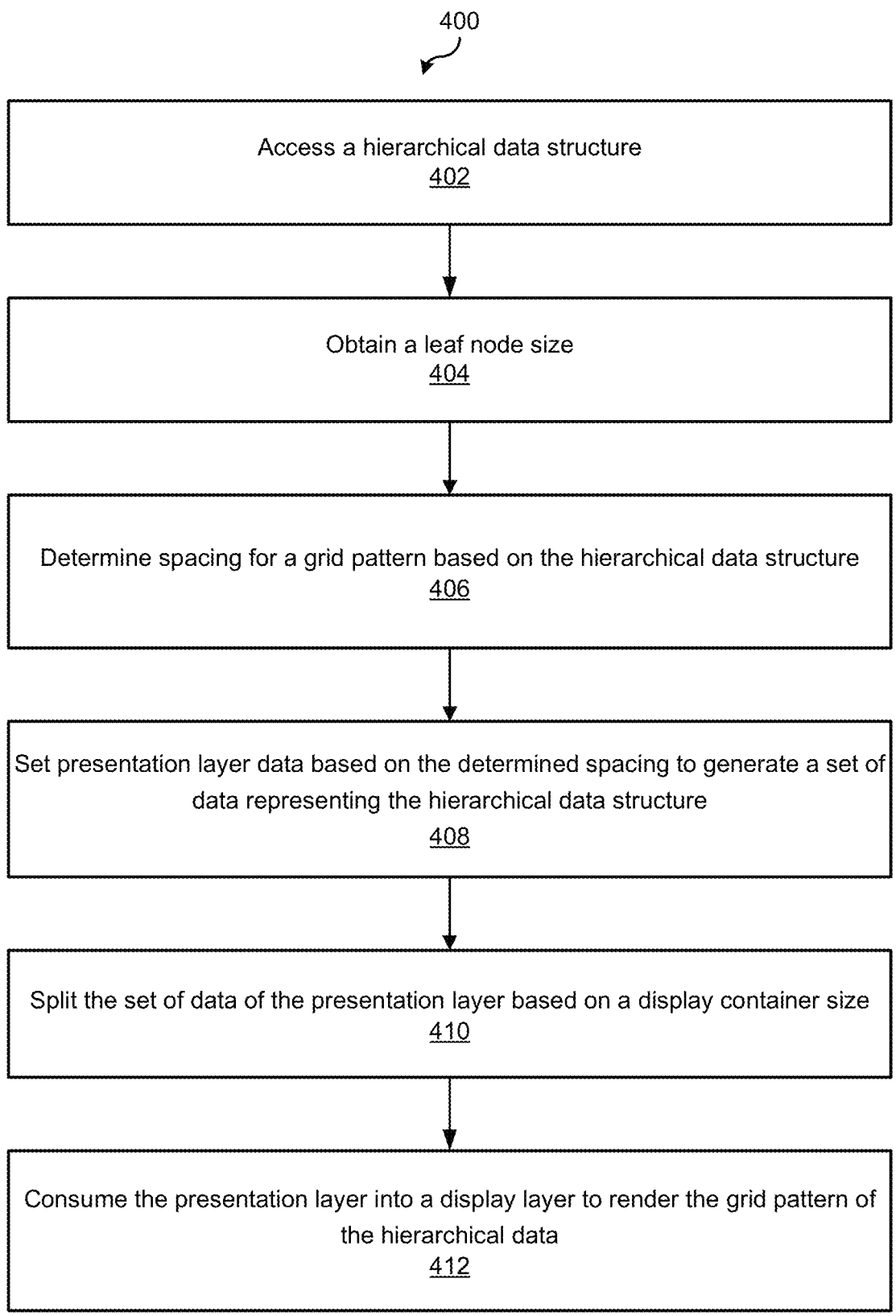
FIG. 4 illustrates an example of a method of transforming a hierarchical data structure into a grid pattern layer.

FIG. 4 illustrates an example of a method 400 of transforming a hierarchical data structure 111 into a grid pattern display.

At 402, the method 400 may include accessing a hierarchical data structure (such as a hierarchical data structure 111). In some examples, the hierarchical data structure may be accessed in various data objects or formats that convey hierarchical relationships, such as distributed arrays, native data structures, and/or other techniques. Examples of native data structures may include JAVASCRIPT Object Notation (JSON) tree data, extensible markup language (XML), and/or other built-in hierarchical ways to convey hierarchical data.

At 404, the method 400 may include obtaining a leaf node size. The leaf node size may refer to an amount of display space to be occupied in a grid pattern by a corresponding leaf node of the hierarchical data structure. For example, the leaf node size may be an amount of display space that is allocated to the cell 332 in the grid pattern. In particular, the leaf node size may include dimensions such as width and height in the display space. The display size (or its dimensions) may be expressed in absolute display units such as a number of pixels or relative display units such as a ratio. In some examples, the leaf node size may be subject to a minimum size in which case the leaf node size will be at least the minimum size. In some examples, the leaf node size may be subject to a maximum size in which case the leaf node size will be at most the maximum size.

Figure 5:
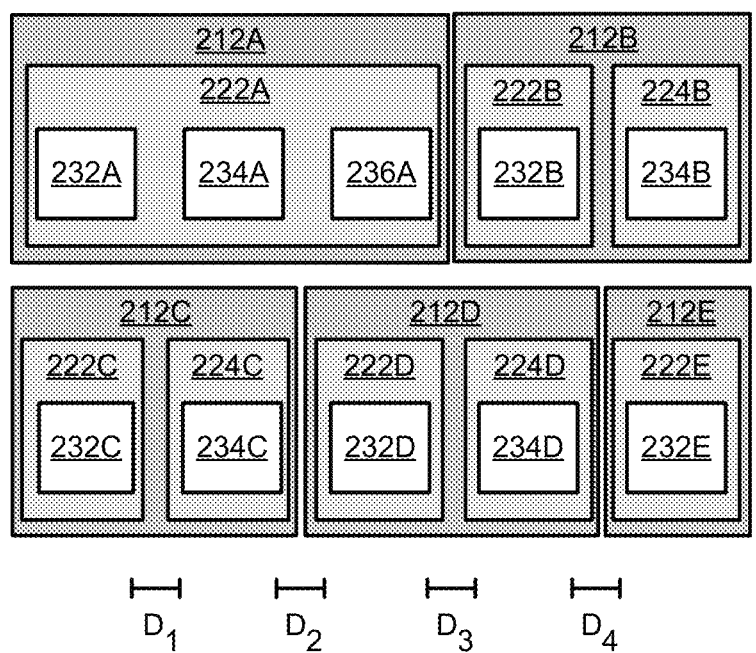
FIG. 5 illustrates an example of equally spacing cells representing leaf nodes in a grid pattern layer.

At 406, the method 400 may include determining spacing for a grid pattern based on the hierarchical data structure. The spacing may define placement of the one or more cells and one or more groups in the grid pattern in a way that achieves the same distance between cells that represent leaf nodes, regardless of the node level at which a leaf node is located. For example, FIG. 5 illustrates an example of equally spacing cells representing leaf nodes in a grid pattern display. As illustrated, group 212A (corresponding to a root node) includes a cells 222A (corresponding to a child node). Cells 222A has nested therein cells 232A, 234A, and 236A (each corresponding to a leaf node). Group 212B (corresponding to another root node) includes cells 222B and 224B (each corresponding to a child node). These cells 222B and 224B respectively have nested therein cells 232B and 234B (each corresponding to a leaf node). Group 212C (corresponding to yet another root node) includes cells 222C and 224C (each corresponding to a child node). These cells 222C and 224C respectively have nested therein cells 232C and 234C (each corresponding to a leaf node). Group 212D (corresponding to another root node) includes cells 222D and 224D (each corresponding to a child node). These cells 222D and 224D respectively have nested therein cells 232D and 234D (each corresponding to a leaf node). Group 212E (corresponding to another root node) includes a cell 222E (corresponding to a child node). Cell 222E has nested therein a cell 232E (corresponding to a leaf node). Distances between each of the leaf nodes may be equal to one another. For example, distances $D_1$-$D_4$ may be equal to one another so that there is uniform spacing between leaf nodes. Regardless of where a given leaf node is in a hierarchical data structure, its cell representation in a grid pattern will be equally spaced from another cell, which represents another leaf node. For example, as shown, spacing given by distances $D_1$-$D_4$ are equal to one another.

To determine a margin, the method 400 may include determining a distance between two nodes that do not share a common ancestor other than a root node. The base margin without any calculation, these two nodes will determine the distance between leaf nodes since this distance is the largest distance that two leaf nodes would have had between them.

Depending on the node level at which a node being laid out is located, different margins may be applied. For example, different sizes of margins for a node may be used depending on its node level. The difference in margins applied per node level may ensure that a consistent grid pattern is rendered with uniform spacing. The higher the level of the node (the more nested a node is), a larger margin may be used. For example, leaf nodes may be spaced apart from one another more so than parent nodes are spaced apart from one another, as illustrated in FIG. 5.

For data elements at the right-most position of their parent (they are the last child), their margin-right may be set to zero. For other nodes and direct children of the root node, their margin-right may be determined based on Equation 1:

$$\text{Margin-right} = 2 \times (NL-1) \times bp + bm \quad (1),$$

In which:
NL=node level,
bp=a predefined, configurable, base padding value, and
bm=a predefined, configurable, base margin value.

Figure 6:
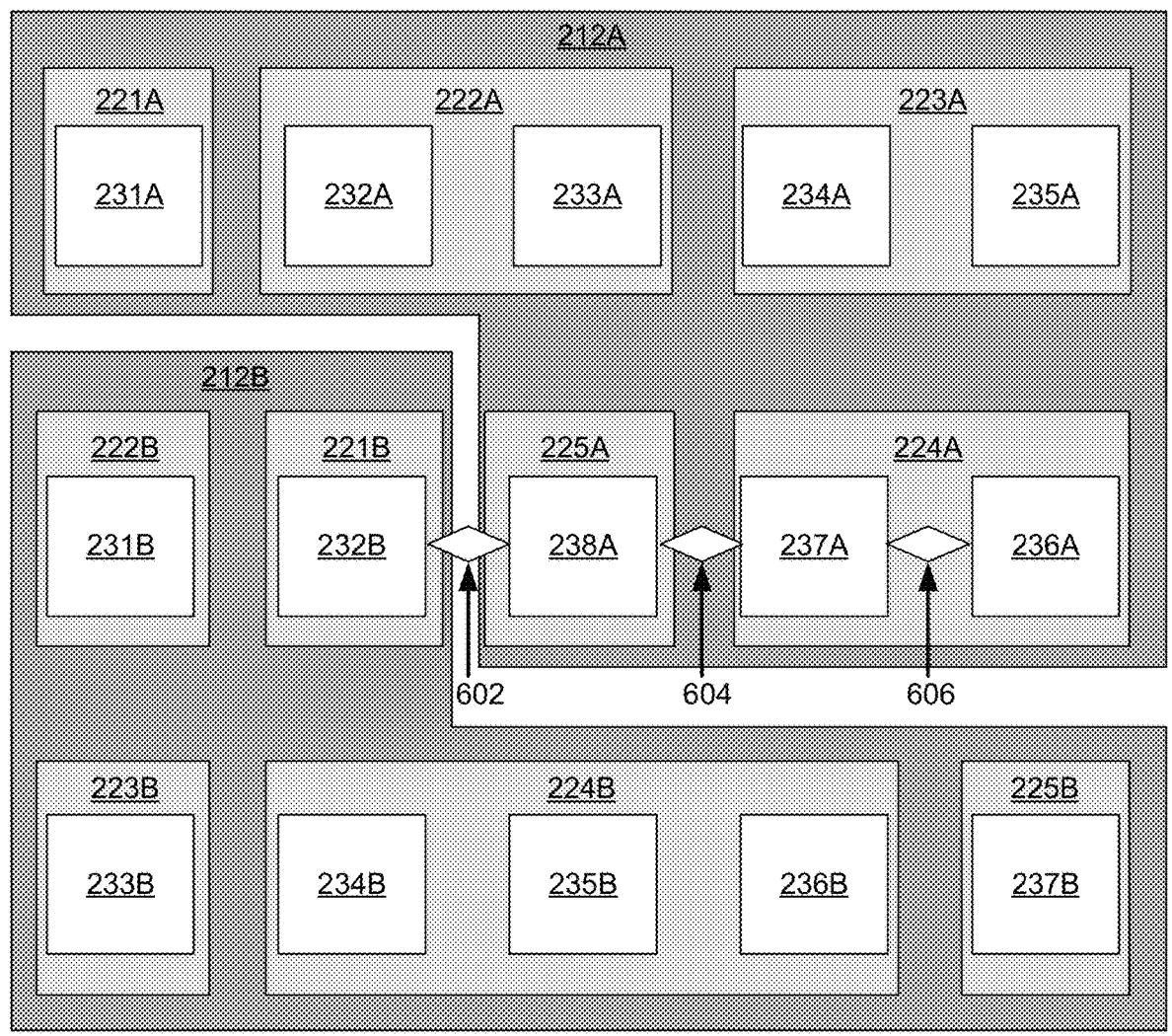
FIG. 6 illustrates another example of spacing of leaf nodes in a grid pattern layer.

In the example of Equation (1), left margins are not used and spacing relies upon the right margin. In other examples, left margins may be determined and right margins are not used, using appropriate transformations of Equation 1 to determine left instead of right margins. It should be noted that a sum of paddings (given by $2 \times (NL-1) \times bp$) may be applied to parent groupings in order to generate a consistently-spaced grid pattern with uniform spacing. It should be further noted that a margin (bm) may be applied to the direct children of a root node. Examples of determining margins for spacing leaf nodes in a grid pattern display are described with reference to FIG. 6, which illustrates an example of leaf node spacing in a grid pattern display. Referring to FIG. 6, as illustrated, group 212A (corresponding to a root node) includes cells 222A-225A (each corresponding to a child node). These cells 221A-225A respectively have nested therein cells 231A-238A (each corresponding to a leaf node). Group 212B (corresponding to another root node) includes cells 221B-225B (each corresponding to a child node). These cells 221B-225B respectively have nested therein cells 231B-237B (each corresponding to a leaf node). Distances between each of the leaf nodes may be equal to one another. The determination of distances 602, 604, and 606 are illustrated using a base margin of 4 pixels (px) and a base padding of 1 px.

For distance 602:
1. Node 232B—right padding: 1 px (bp) (margin=0 as it is positioned at the end of its parent).
2. Node 221B—right padding: 1 px (bp) (as it is positioned at the end of its parent).
3. Node 212B (group)—Parent of 221B— right margin (name not visible in the image): nl=1=>(2*(0)*1)+4=4 px.
4. Node 212B-1 px (bp) (as it is positioned at the end of its parent).
5. Node 212A (group)— left padding (name not visible in the image): 1 px (bp)
6. Node 225A—left padding: 1 px (bp).
7. Node 238A—left padding: 1 px (bp).
8. Total: 10 px For distance 604:
1. Node 238A—right padding: 1 px (bp) (margin=0 as it is positioned at the end of its parent).
2. Node 225A— right padding: 1 px (bp)
3. Node 225A—right margin: nl=2=>(2*(1)*1)+4=6 px
4. Node 224A: 1 px (bp).
5. Node 237A: 1 px (bp).
6. Node Total: 10 px For distance 606:
1. Node 237A—right padding: 1 px (bp).
2. Node 237A—right margin: nl=3=>(2*(2)*1)+4=8 px
3. Node 236A: 1 px (bp).
4. Total: 10 px At 408, the method 400 may include setting presentation layer data based on the determined spacing to generate a set of data representing the hierarchical data structure. Presentation layer data may include the width, height, padding, margin, and/or other data for a given group (root node) or cell (other nodes). To set the presentation layer data, the method 400 may include recursively iterating through data elements that represent the nodes and setting their values based on the padding and margin determined for each. In this manner, each data element representing a node may have its presentation layer data set, which may be stored as part of its state. In some examples, after such iterative processing, the presentation layer will be rendered as a set of data elements with x-positions in the row based on the determine padding and margin data for the nodes. Each data element in the set of data elements may include attributes, metadata, and/or other data that may be used to identify a position in the view layer at which the data is to be rendered.

At 410, the method 400 may include splitting the set of data elements in the presentation layer based on a size of a display container within which the view layer will be rendered. The size may include a width and/or height, which may be expressed in pixels, unit of length, and/or other measurement. For example, to split the row, the method 400 may include recursively placing data elements in the single row of the presentation layer until further elements will no longer fit within the width of the display container. FIGS. 7A-7E shows an example progression of splitting a row of data elements in a presentation layer 721 based on a size of a display container 710 having a container width 711. In FIGS. 7A-7E, three node levels are shown with the same shading as shown in FIG. 3 to represent root nodes, parent nodes, and leaf nodes with reference number omitted for the root and parent nodes. Data elements representing leaf nodes are labeled 1-18 to show an example of laying out the leaf nodes in the grid pattern.

Figure 7A:
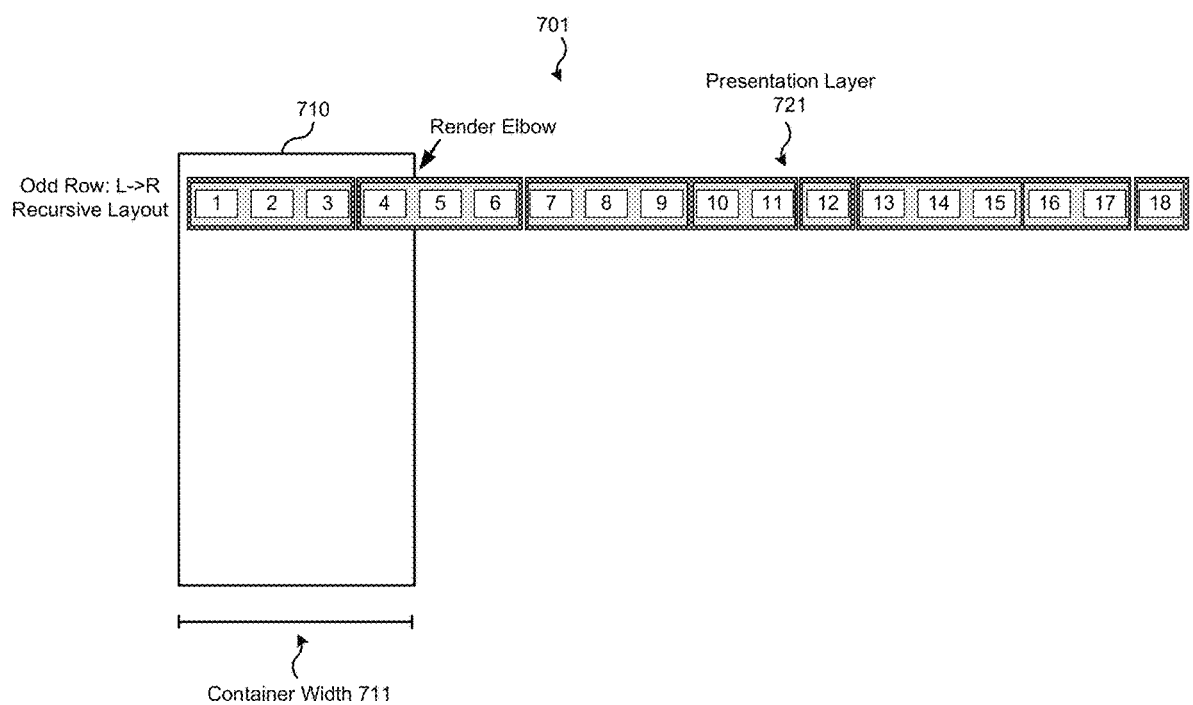
FIG. 7A illustrates an example of a part of a progression of laying out hierarchical data into a grid.
Figure 7B:
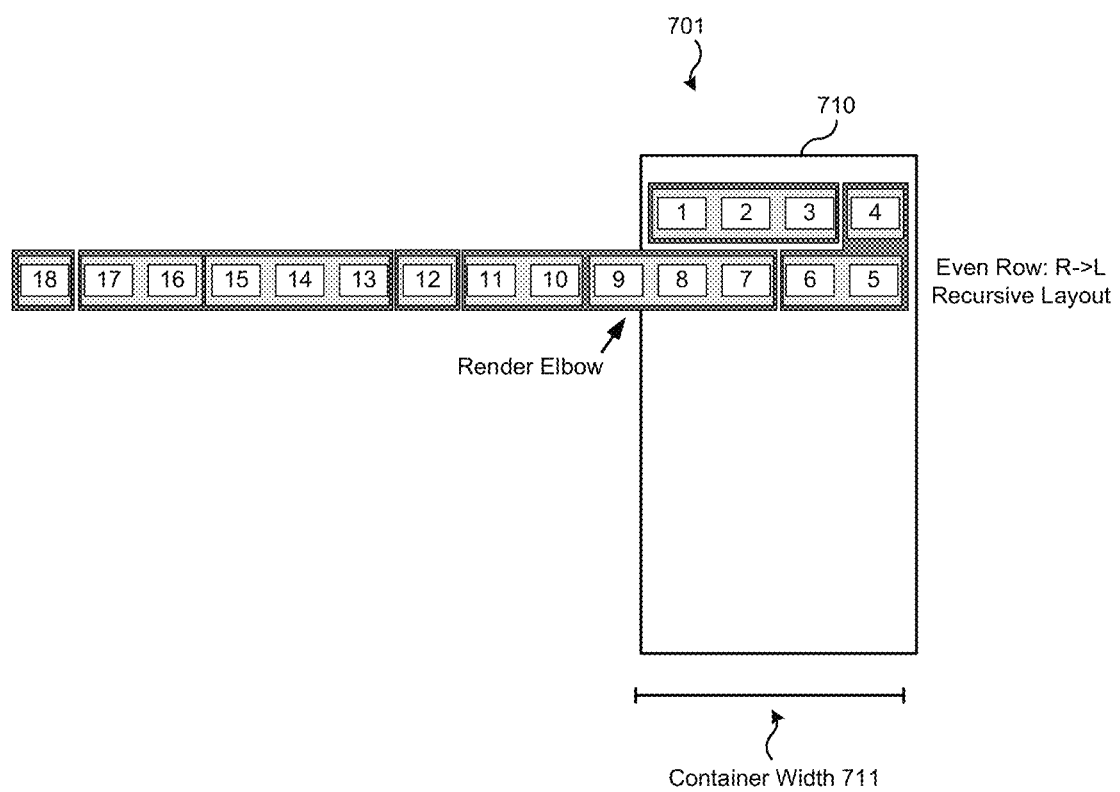
FIG. 7B illustrates an example of another part of a progression of laying out hierarchical data into a grid.
Figure 7C:
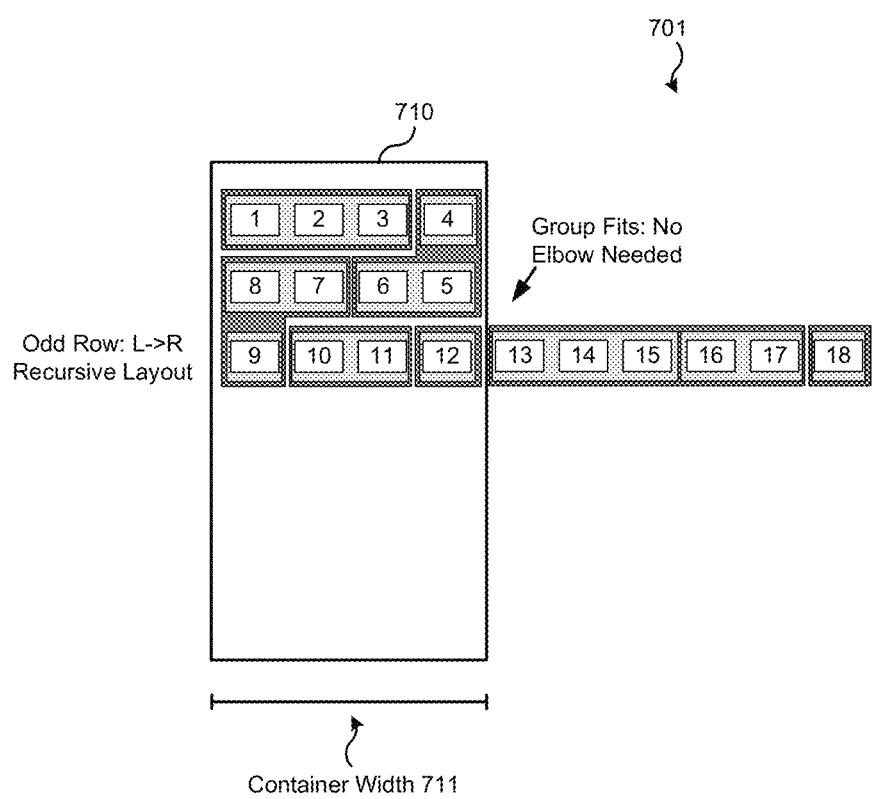
FIG. 7C illustrates an example of another part of a progression of laying out hierarchical data into a grid.
Figure 7D:
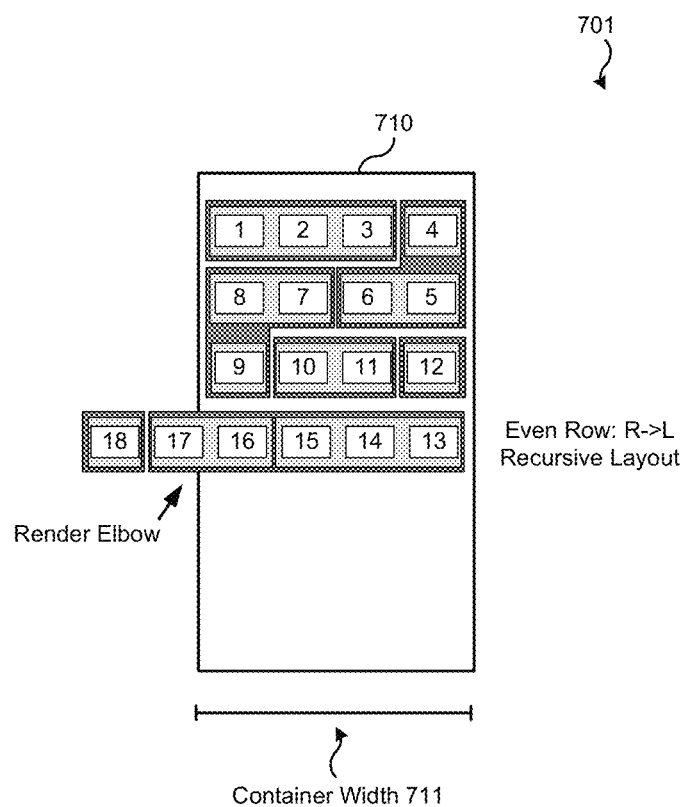
FIG. 7D illustrates an example of another part of a progression of laying out hierarchical data into a grid.
Figure 7E:
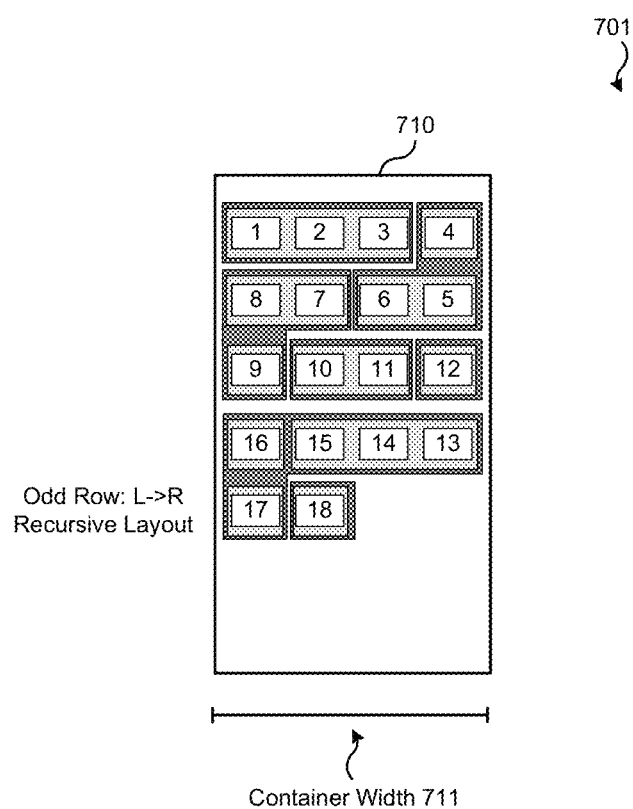
FIG. 7E illustrates an example of another part of a progression of laying out hierarchical data into a grid.

Referring to FIG. 7A, the method 400 may include laying out the elements of the presentation layer 721 based on a layout pattern 701 in which the elements are laid out starting from the left (as intended to be perceived by a reader) of the display container 710 and proceeding to the right. A root node has leaf nodes 4-6 in which leaf nodes 5 and 6 overflow the container width 711. As such, the nodes 4-6 of the root node will be split across different rows. These split nodes may be added to a list of components to be placed in the display container 710 with an indication of the split. For example, each of the leaf nodes will be stored with attributes such as their width and metadata to indicate that these nodes are to be visually grouped together across rows when rendering the view layer. Such visual grouping may be indicated by the same group shading, coloring, or other visual indication of a group. In particular, an elbow will be rendered at the point of overflow. Referring to FIG. 7B, the leaf nodes 4, 5, and 6 are split at the elbow and the visual indication includes the same shading for the group (which represents the root node to which the leaf nodes 4, 5, and 6 ultimately belong). In this way, even though the leaf nodes 4-6 are split across different rows, they are easily identifiable as belonging to the same root node group. In the layout pattern 701, odd rows in the view layer may have elements laid out from left-to-right and even rows may have elements laid out from right-to-left, as illustrated in the progression of FIGS. 7A-7E. As illustrated, the ordering of elements are appropriately inverted when switching between odd and even rows. Metadata for each of the elements may be updated to reflect this ordering. For example, the margin-right may be transformed to a margin-left to ensure proper layout when switching from odd rows to even rows. It should be noted that an elbow may not be necessary when switching to a new row, such as illustrated in FIGS. 7C and 7D. It should also be noted that 410 may involve updating element attributes and metadata of the presentation layer 721 and the actual visual rendering may occur at 412.

At 412, the method 400 may include consuming the presentation layer into a display layer to render a grid pattern of the hierarchical data. Once the presentation layer data has been set at 410, the view layer may be rendered. For example, the presentation layer data (such as width, height, margin, and so forth) may be rendered into a display. To do so, groups may be rendered recursively. When a group renders its child nodes, the child nodes will render its own child in the same way, and so on, until the end of the tree is reached at the leaf nodes. As previously noted, to show the hierarchy within the tree, distinguishing visual characteristics may be used. For example, the background color of the nodes is modified (from a configurable base color) so that any node gets a little lighter (or darker if configured) than its parent. It should be noted that if the number of rows in the grid exceed a height of the display container, a scroll item may be used.

Figure 7F:
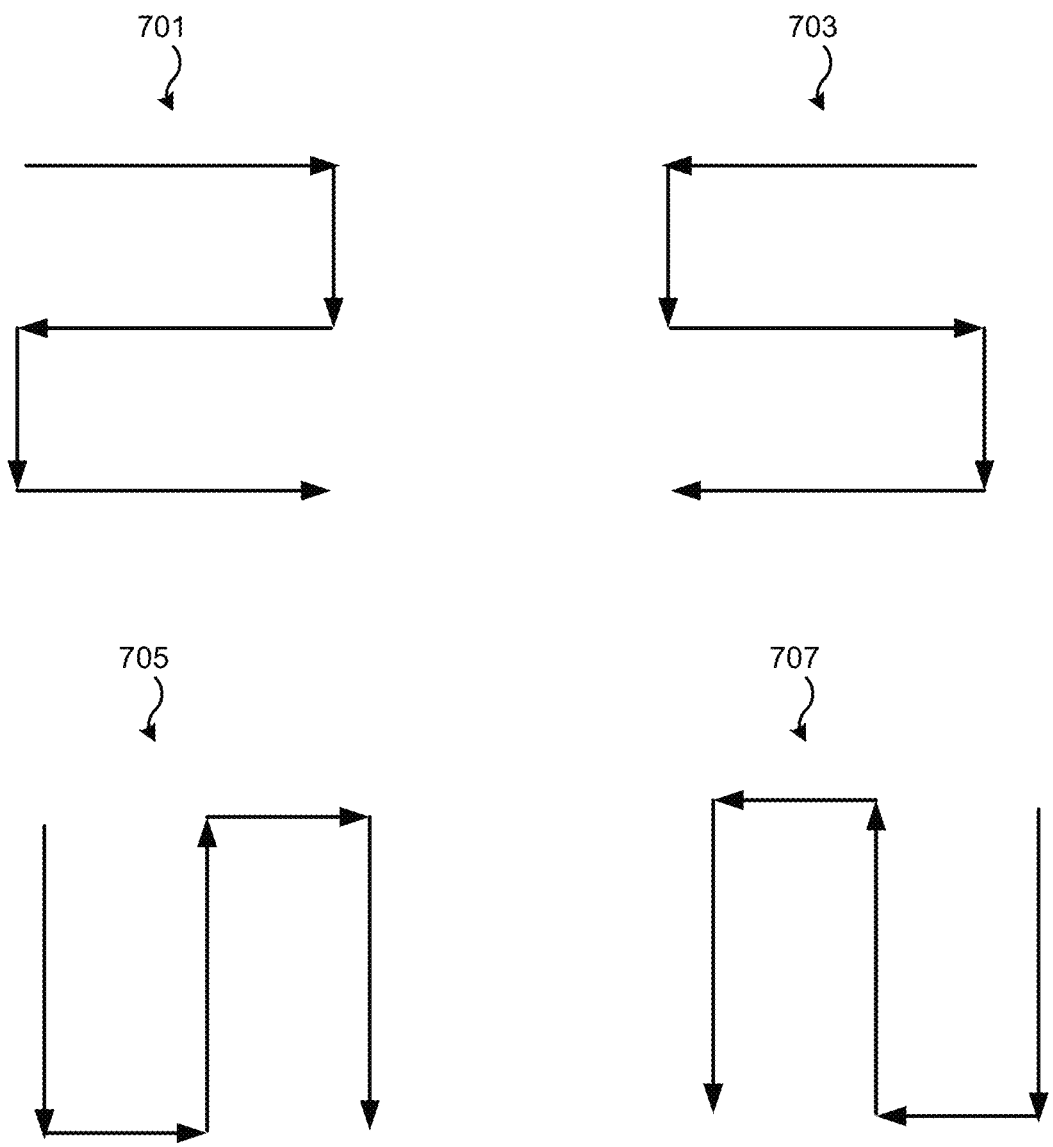
FIG. 7F illustrates different examples of layout patterns for laying out hierarchical data into a grid.

The layout pattern 701 is described for convenience. Other layout patterns may be used as well or instead. For example, FIG. 7F shows difference examples of layout patterns. Layout pattern 701 shows the pattern illustrated in FIGS. 7A-E. Layout patterns 703, 705, and 707 may be used instead. These layout patterns 703, 705, and 707 are shown to illustrate different types of layout patterns that may be used. Still other layout patterns not illustrated may be used as well, such as generally starting from the bottom to top (layout patterns 701, 703, 705, and 707 generally start from the top to bottom).

Figure 8:
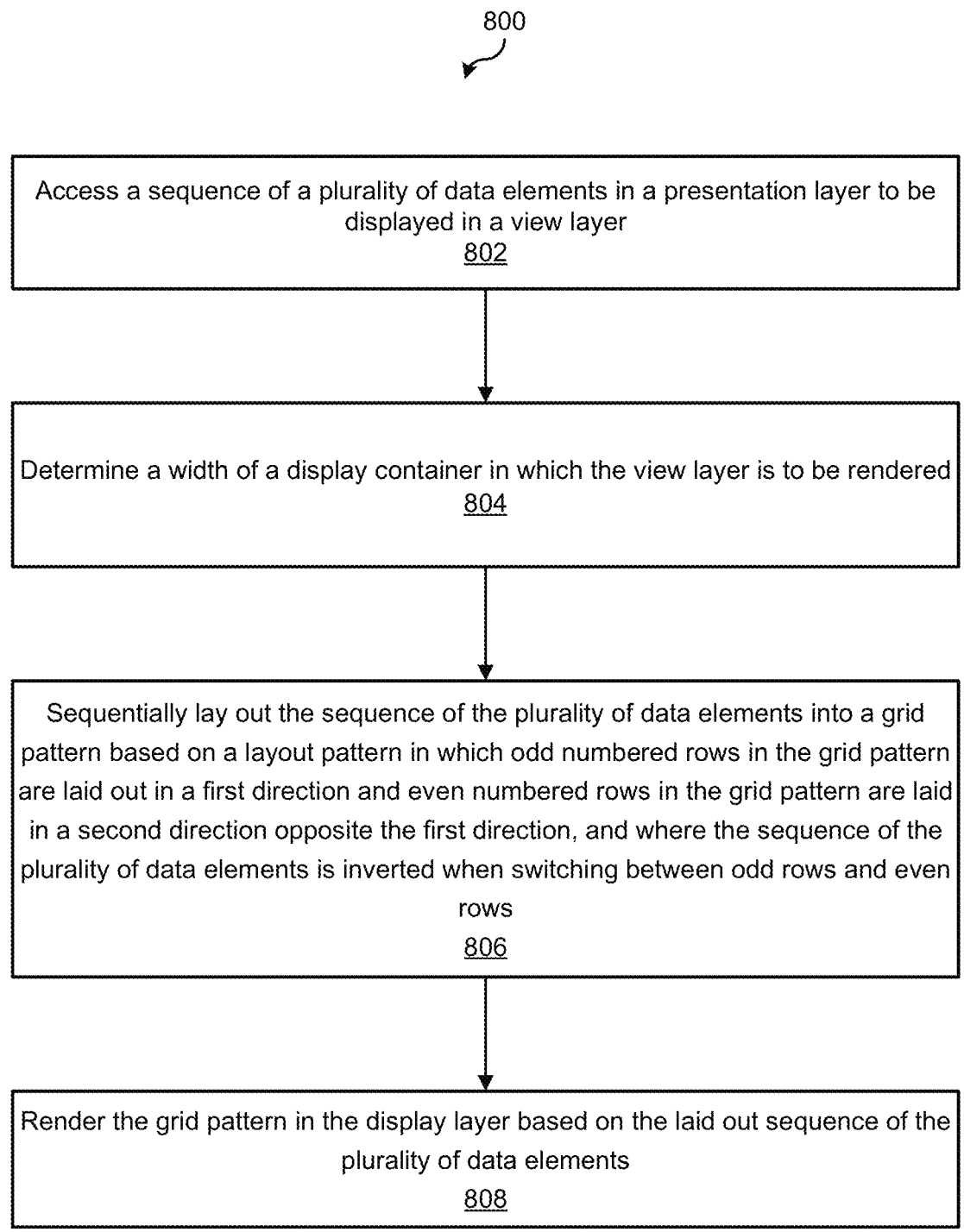
FIG. 8 illustrates an example of a method of laying out a set of data in a presentation layer representing a hierarchical data structure into a grid.

FIG. 8 illustrates an example of a method 800 of laying out a set of data in a presentation layer representing a hierarchical data structure into a grid. At 802, the method 800 may include accessing a sequence of a plurality of elements in a presentation layer to be displayed in a view layer 123. For example, each element may represent a node (root node, parent node, and/or leaf node) in a hierarchical data structure 111. The hierarchical data structure 111 may therefore be rendered for display via the view layer 123. At 804, the method 800 may include determining a width of a display container in which the view layer is to be rendered. The display container may be dynamically resized, which may result in repeating method 800 to dynamically re-render the hierarchical data structure 111. At 806, the method 800 may include sequentially laying out the sequence of the plurality of elements in a grid based on a layout pattern in which odd numbered rows in the grid pattern are laid out in a first direction and even numbered rows in the grid pattern are laid in a second direction opposite the first direction, and where the sequence of the plurality of elements is inverted when switching between odd rows and even rows. An example of laying out the elements in a grid is shown in FIGS. 7A-7E. FIG. 7F illustrates different examples of layout patterns that may be used during the layout process illustrated in FIGS. 7A-7E. At 808, the method 800 may include rendering the grid in the view layer 123 based on the laid out sequence of the plurality of elements.

The datastores (such as hierarchical datastore 110) may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

Each of the computer system 120 and devices 130 may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

The computer system 120 and the one or more devices 130 may be connected to one another via a communication network (not illustrated), such as the Internet or the Internet in combination with various other networks, like local area networks, cellular networks, or personal area networks, internal organizational networks, and/or other networks. It should be noted that the computer system 120 may transmit data, via the communication network, conveying the grid patterns one or more of the devices 130. Although not shown, the one or more devices 130 may each include one or more processors.

The systems and processes are not limited to the specific implementations described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by the computer system 120 illustrated in FIG. 1.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
a processor programmed to:
  access a hierarchical data structure comprising a root node, a parent node, and a plurality of leaf nodes, wherein the root node is logically connected to the parent node and the parent node is logically connected to the plurality of leaf nodes, each of the plurality of leaf nodes storing a state and having no child nodes;
  obtain a leaf node size;
  determine spacing for a grid pattern based on the hierarchical data structure such that the determined spacing results in uniform spacing between each of the leaf nodes in the grid pattern;
  set presentation layer data based on the determined spacing to generate a set of data elements, the set of data elements representing the hierarchical data structure;
  split the set of data elements of the presentation layer based on a size of a display container, the display container being used to display the grid pattern, wherein to split the set of data elements, the processor is further programmed to lay out the set of data elements based on a layout pattern that defines an order and direction in which representations of the nodes of the hierarchical data structure are to be laid out,
  wherein the layout pattern comprises a left-to-right layout pattern in which the representations are laid out in order from left-to-right for odd number rows in the grid pattern and right-to-left in the grid pattern for even number rows in the grid pattern; and
  consume the presentation layer into a display layer to render a grid transformation of the hierarchical data.

2. The system of claim 1, wherein a sequence in which the set of data elements is laid out is inverted when switching between odd and even rows in the grid pattern.

3. The system of claim 2, wherein the root node has two or more leaf nodes, and wherein to split the set of data elements, the processor is further programmed to:
  determine that at least one of the two or more data elements corresponding to the two or more leaf nodes overflows a width of the display container; and
  generate metadata indicating that the two or more data elements are to be split across different rows in the display layer.

4. The system of claim 3, wherein the processor is further programmed to:
  when the display layer is rendered, generate a visual indication that the two or more data elements split across different rows are part of a same group that represents a common parent node.

5. The system of claim 4, wherein the visual indication comprises an elbow feature that visually indicates the different rows where the two or more data elements are split to set the two or more data elements apart from other data elements not originating from the same group.

6. The system of claim 1, wherein to determine spacing, the processor is further programmed to:
  determine a padding and/or a margin.

7. The system of claim 1, wherein to set the presentation layer data, the processor is further programmed to:
  set attribute data for each of the representations in the presentation layer data.

8. A method, comprising:
  accessing, by a processor, a hierarchical data structure comprising a root node, a parent node, and a plurality of leaf nodes, wherein the root node is logically connected to the parent node and the parent node is logically connected to the plurality of leaf nodes, each of the plurality of leaf nodes storing a state and having no child nodes;
  obtaining, by the processor, a leaf node size;
  determining, by the processor, spacing for a grid pattern based on the hierarchical data structure such that the determined spacing results in uniform spacing between each of the leaf nodes in the grid pattern;
  setting, by the processor, presentation layer data based on the determined spacing to generate a set of data elements, the set of data elements representing the hierarchical data structure;
  splitting, by the processor, the set of data elements based on a size of a display container, the display container being used to display the grid pattern, wherein splitting the set of data elements comprises laying out the set of data elements based on a layout pattern that defines an order and direction in which representations of the nodes of the hierarchical data structure are to be laid out,
  wherein the layout pattern comprises a left-to-right layout pattern in which the representations are laid out in order from left-to-right for odd number rows in the grid pattern and right-to-left in the grid pattern for even number rows in the grid pattern; and
  consuming, by the processor, the presentation layer into a display layer to render a grid transformation of the hierarchical data.

9. The method of claim 8, wherein a sequence in which the set of data elements is laid out is inverted when switching between odd and even rows in the grid pattern.

10. The method of claim 9, wherein the root node has two or more leaf nodes, and wherein splitting the set of data elements comprises:
- determining that at least one of the two or more data elements corresponding to the two or more leaf nodes overflows a width of the display container; and
- generating metadata indicating that the two or more data elements are to be split across different rows in the display layer.

11. The method of claim 10, further comprising:
- when the display layer is rendered, generating a visual indication that the two or more data elements split across different rows are part of a same group that represents a common parent node.

12. The method of claim 11, wherein the visual indication comprises an elbow feature that visually indicates the different rows where the two or more data elements are split to set the two or more data elements apart from other data elements not originating from the same group.

13. The method of claim 8, wherein determining the spacing comprising:
- determining a padding and/or a margin.

14. The method of claim 8, wherein setting the presentation layer data comprises:
- setting attribute data for each of the representations in the presentation layer data.

15. A non-transitory computer-readable storage medium storing instructions that, when executed by a processor, programs the processor to:
- access a sequence of a plurality of data elements in a presentation layer to be displayed in a view layer;
- determine a width of a display container in which the view layer is to be rendered;
- sequentially lay out the sequence of the plurality of data elements into a grid pattern based on a layout pattern in which odd numbered rows in the grid pattern are laid out in a first direction and even numbered rows in the grid pattern are laid in a second direction opposite the first direction, and wherein the sequence of the plurality of data elements is inverted when switching between odd rows and even rows; and
- render the grid pattern in the display layer based on the laid out sequence of the plurality of data elements;
- determine that two or more data elements from among the plurality of data elements are to be visually depicted as being associated with one another;
- determine that at least one element from among the two or more data elements overflows the width of the display container;
- split the two or more data elements across different rows; and
- render an elbow feature that encompasses the two or more data elements across the different rows and distinguishes the two or more data elements from other data elements in the different rows.

16. The system of claim 1, wherein to determine spacing for the grid pattern, the processor is further programmed to:
- determine an equal amount of space between each of the plurality of leaf nodes.

* * * * *